C. E. JAMES.
SPRING HUB.
APPLICATION FILED JULY 12, 1917.

1,324,596.

Patented Dec. 9, 1919.
2 SHEETS—SHEET 1.

Inventor
Charles E. James,

By Talbert & Parker
Attorneys

C. E. JAMES.
SPRING HUB.
APPLICATION FILED JULY 12, 1917.

1,324,596.

Patented Dec. 9, 1919.
2 SHEETS—SHEET 2.

Inventor
Charles E. James,

By Talbert & Parker
Attorneys

UNITED STATES PATENT OFFICE.

CHARLES E. JAMES, OF CAIRO, IOWA.

SPRING-HUB.

1,324,596.     Specification of Letters Patent.     Patented Dec. 9, 1919.

Application filed July 12, 1917. Serial No. 180,149.

*To all whom it may concern:*

Be it known that I, CHARLES E. JAMES, a citizen of the United States, residing at Cairo, in the county of Louisa and State of Iowa, have invented certain useful Improvements in Spring-Hubs, of which the following is a specification, reference being had therein to the accompanying drawing.

This invention relates to improvements in vehicle wheels and particularly to those types which embody resilient cushioning means mounted within sectional hubs.

In the first instance the present invention is designed to provide a spring cushioning means completely housed within a novel hub of a vehicle wheel whereby to prevent a tendency toward lateral movement of the spokes to obviate possible dishing of the wheel, and possible clogging or rusting of the cushioning mechanism through contact with exterior deleterious substances or conditions.

A coördinate object of the invention is the provision of a spring cushioning means removable from the wheel in its entirety to permit repairs to be easily fitted or new parts readily substituted when circumstances so require.

Another object of the invention is to provide in connection with suitable securing means for the hub sections bearings or abutments adapted to limit excessive movement of the cushioning means resultant from weakness of the springs through wear or continuous activity or due to engagement with extraordinarily pronounced road bed irregularities.

A further object of the invention is to provide a spring cushioning device whereby much of the shock incident to travel will be absorbed by simultaneous actuation of all of its component parts thereby effectually distributing the stress and strain upon the cushioning means to prolong the duration of its efficiency.

A still further object of the invention is to improve upon the complicated and delicate mechanism heretofore embodied in devices in the art to which this invention pertains by providing a durable and efficient spring cushioning means of very few and sturdy parts which may be used in conjunction with both resilient or non resilient tires and with the usual form of spoke and felly construction now in general use.

With the above and other objects in view, the present invention consists in the combination and arrangement of parts hereinafter more fully described, illustrated in the accompanying drawings and particularly pointed out in the appended claim, it being understood that changes may be made in the form, proportion, size and minor details without departing from the spirit of the invention.

In the accompanying drawings.

Similar reference characters indicate corresponding parts throughout the several views in the drawings.

As shown, a vehicle wheel (A) has a tire (1), felly (2) and spokes (3), all of which, together with the vehicle axle (4), are of a common type and are here conventionally illustrated to clearly show the application of the present invention.

Figure 1:
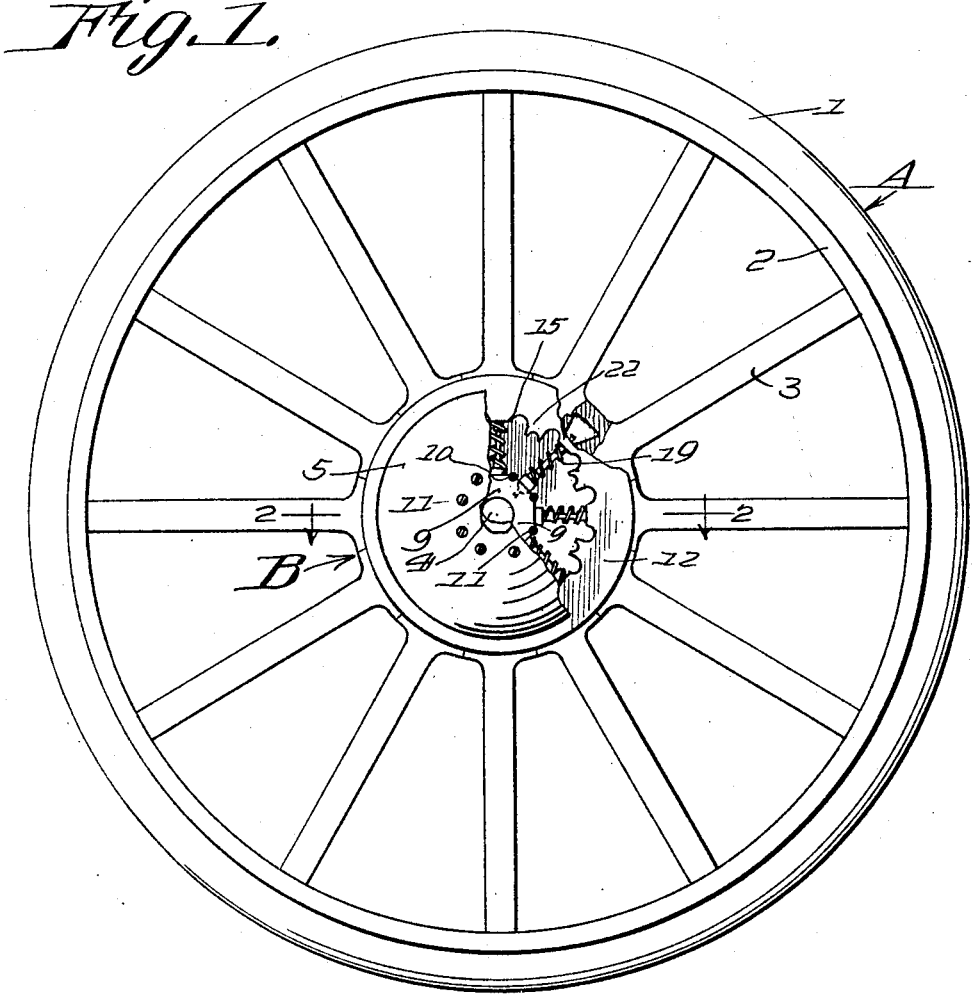
Figure 1 is a side elevational view of a vehicle wheel embodying the invention and partially broken away to show some of its component parts in detail.
Figure 2:
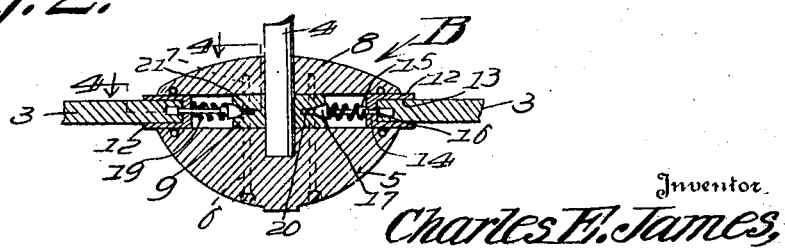
Fig. 2 is a transverse sectional view taken on the line 2—2 of Fig. 1.
Figure 3:
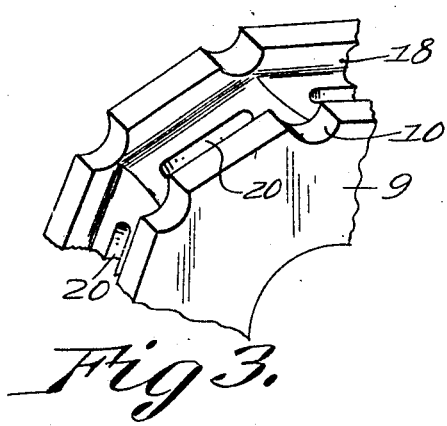
Fig. 3 is a partial fragmentary view of the floating hub annulus used in the invention.
Figure 4:
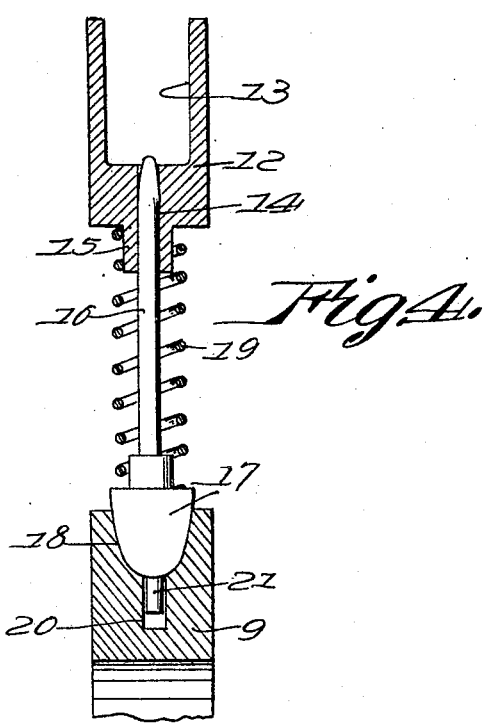
Fig. 4 is a sectional view on the line 4—4 of Fig. 2 showing the supporting shoe together with its shank in detail and operably positioned with respect to the hub annulus and intermediate hub section.
Figure 5:
Fig. 5 is a perspective enlarged view of the spring and supporting shoe together with its shank.
Figure 6:
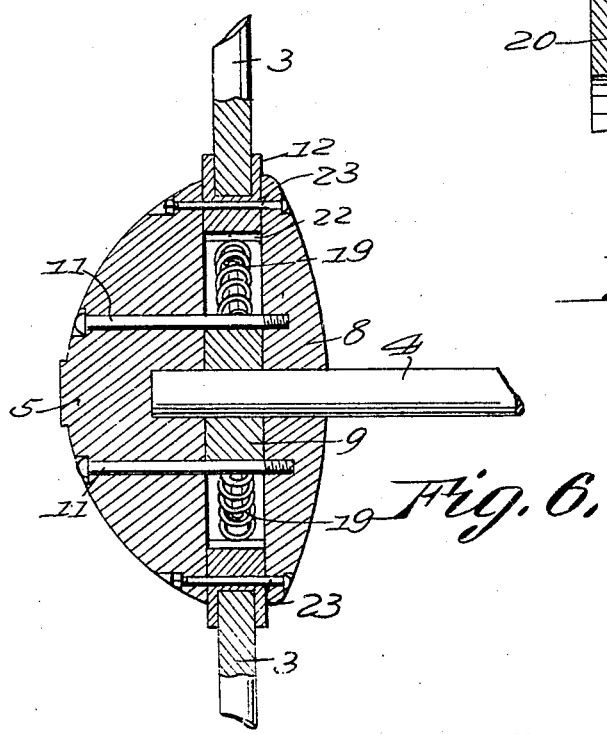
Fig. 6 shows a slight modification.

The hub generally designated by (B) and shown in Fig. 1 as mounted on the axle (4) has a semi-spherical outer section 5 provided with a circular row of equally spaced apart openings (6) adapted to register with similar openings (7) formed in an inner hub section (8) held in spaced relationship to the outer hub section (5) by an intermediate hub section (9) provided with transverse spaced apart slots or cut-away portions (10) for receiving a plurality of bolts or screws (11) secured within the openings (6) and (7) to hold the hub sections together as an entirety.

As a means for cushioning the wheel a floating hub annulus (12) is grooved upon its external periphery as at (13) to receive the terminals of the spokes (3) and is provided with a plurality of radial bores (14) communicating with the groove (13) and extending through a plurality of equally spaced apart cylindrical projections (15) formed on the interior periphery of the floating annulus (12). Mounted and freely movable within the bores (14) are the reduced shank portions (16) of a plurality of radial supporting shoes (17) seated within a groove (18) formed in the external periphery of the intermediate hub section (9) and slightly reduced adjacent the shank (16) to receive embracing compression springs (19) which engage about the cylindrical projections (15) upon the annulus (12) to floatingly support the said annulus and consequently the wheel (1) upon the vehicle axle (4). In order to assist slight circumferential movement of the device in its entirety a plurality of cut-away portions (20) are provided in the hub section (9) and communicating with the groove (18) within which retaining lugs (21) on the shoes (17) are adapted to be received and prevent the possibility of dislodgment of the shoes from the grooves (18) due to such movement.

It has been found that the springs (19) become slightly weakened after long and continuous use thus permitting excessive movement of the floating annulus (12), and in order to prevent the possibility of the device becoming consequently inoperative a plurality of radially extending grooved abutment projections (22) are formed upon the internal periphery of the annulus (12) intermediate the projections (15) which engage the shanks of the bolts (11) to limit the movement of the annulus (12) with respect to the hub sections (5) and (8).

Should it be desired to dispense entirely with the hub cushioning means and substitute in its stead the usual resilient tire a plurality of bolts (23) may be passed through the inner and outer hub sections (5) and (8) and the floating annulus (12) as is clearly illustrated in the slight modification shown in Fig. (6).

Particular attention is directed to the fact that shocks incident to travel are absorbed by simultaneous actuation of all of the springs (19) due to the peculiar construction of the floating annulus (12). Stress is also laid upon the fact that adjustment of the inner and outer hub sections (5) and (8) with respect to the annulus may be readily affected by operation of the bolts or screws (11).

The complete operation of this invention is thought to be clear from the foregoing description when taken in connection with the accompanying drawings but it is here particularly pointed out that to gain access to the various parts embodied in the invention one has merely to remove the outer hub section (5). Attention is also called to the fact that sufficient circumferential movement of the cushioning means is permitted to coöperate to a very material degree with the actual devices of the cushioning means to provide a great degree of resiliency.

In addition to the advantages of this invention which have been stated or inferred certain other features of simplicity, durability and efficiency are thought to be obvious from the construction of the preferred embodiment of the invention as herein described, illustrated in the accompanying drawings and hereinafter claimed.

What is claimed is:

The combination with a vehicle wheel having spokes, of a sectional hub embodying an outer section, an inner section and an intermediate section interposed between the inner and outer sections and spacing the two latter apart, the said intermediate section being of less diameter than the inner and outer sections and being formed with a plurality of transversely disposed slots on its outer periphery, bolts securing the inner and outer sections in close contact with the intermediate section and resting in the said slots to preclude relative movement between the said sections, an annulus formed with a circumferential groove in which the said spokes are seated, shoes seated in a groove formed on the periphery of the intermediate section, the said shoes being provided with radially protected shank portions passing through radial bores formed in the annulus so that there may be relative movement between the annulus and the shanks in the direction of the length of the latter, and compression springs surrounding said shanks and bearing one end up on the shoes and the remaining ends against the inner periphery of the annulus, the said intermediate section being formed with narrow elongated slots in the bottom of the peripheral slot therein and extending in the direction of the circumference of said section, the shoes being formed with retaining lugs entering the last said slots, whereby the shanks may swing from their radial positions toward positions approaching the tangential to permit free movement of the annulus, the said lugs and slots in which they engage precluding other movement of the shanks.

In testimony whereof I affix my signature

CHARLES E. JAMES.